(12) United States Patent
Wax

(10) Patent No.: US 7,779,954 B2
(45) Date of Patent: Aug. 24, 2010

(54) APPARATUS TO IMMOBILIZE AN INTERNAL COMBUSTION ENGINE MOTOR VEHICLE

(76) Inventor: Jeffrey Wax, 2118 Wilshire Blvd., Suite 407, Santa Monica, CA (US) 90403

( * ) Notice: Subject to any disclaimer, the term of this patent is extended or adjusted under 35 U.S.C. 154(b) by 0 days.

(21) Appl. No.: 12/251,434

(22) Filed: Oct. 14, 2008

(65) Prior Publication Data
US 2009/0152040 A1 Jun. 18, 2009

Related U.S. Application Data

(63) Continuation of application No. 10/941,144, filed on Sep. 14, 2004, now Pat. No. 7,451,851.

(60) Provisional application No. 60/503,513, filed on Sep. 15, 2003.

(51) Int. Cl.
 *B60R 25/00* (2006.01)
 *B60R 19/02* (2006.01)
(52) U.S. Cl. .................. 180/271; 180/287; 293/109
(58) Field of Classification Search ............ 180/271, 180/287; 293/150, 109, 120, 136; 60/324; 123/323; 138/37, 38; 440/89 R
 See application file for complete search history.

(56) References Cited

U.S. PATENT DOCUMENTS

| | | | | |
|---|---|---|---|---|
| 3,493,257 A * | 2/1970 | Fitzgerald et al. | ........... | 293/120 |
| 3,596,963 A * | 8/1971 | Phillips | .......................... | 293/6 |
| 3,694,018 A * | 9/1972 | Levering | ..................... | 293/121 |
| 3,706,468 A * | 12/1972 | Yoviene | ...................... | 293/120 |
| 4,002,362 A * | 1/1977 | Sears et al. | .................. | 293/120 |
| 4,061,384 A * | 12/1977 | Montgomery et al. | ....... | 293/109 |
| 4,225,167 A * | 9/1980 | Buettner et al. | ............. | 293/120 |
| 4,449,605 A * | 5/1984 | Read | .......................... | 180/287 |
| 4,549,090 A * | 10/1985 | Read | ......................... | 307/10.2 |
| 4,652,032 A * | 3/1987 | Smith | ......................... | 293/120 |
| 4,683,735 A * | 8/1987 | Magrobi | ...................... | 70/168 |
| 4,690,240 A * | 9/1987 | Russo | ......................... | 180/287 |
| 4,696,368 A * | 9/1987 | Hummel et al. | ............. | 180/309 |
| 4,826,226 A * | 5/1989 | Klie et al. | ................... | 293/120 |
| 5,005,887 A * | 4/1991 | Kelman | ...................... | 293/120 |
| 5,154,462 A * | 10/1992 | Carpenter | ................... | 293/120 |
| 5,249,442 A * | 10/1993 | Wright | ........................ | 70/164 |
| 5,577,784 A * | 11/1996 | Nelson | ........................ | 293/120 |
| 5,687,773 A * | 11/1997 | Ryan et al. | ................ | 138/96 R |
| 5,839,759 A * | 11/1998 | Trigo | ......................... | 280/762 |
| 5,952,600 A * | 9/1999 | Herr | ........................... | 89/1.11 |
| 6,176,519 B1 * | 1/2001 | Limingoja | .................. | 280/762 |
| 6,213,540 B1 * | 4/2001 | Tusim et al. | ........... | 296/187.02 |
| 6,401,590 B1 * | 6/2002 | Coakley et al. | .............. | 89/1.11 |

(Continued)

*Primary Examiner*—Toan C To
*Assistant Examiner*—George D. Spisich
(74) *Attorney, Agent, or Firm*—Wax Law Group

(57) ABSTRACT

A readily transportable and rapidly deployable vehicle immobilization device is provided. The exhaust of an internal combustion engine is obstructed, resulting in choking off and stopping of the engine. In an aspect, a plug is provided having an extension fixed to the plug for human grasping, and facilitating insertion into an end of a vehicle exhaust pipe. In an aspect the plug expands upon being heated and is adhesive to the exhaust pipe for at least partially sealing the exhaust pipe. In another aspect, a length of adhesive material is attached to the front of a pursuing vehicle and engages an end of an exhaust pipe of a fleeing vehicle.

14 Claims, 4 Drawing Sheets

U.S. PATENT DOCUMENTS

| | | | |
|---|---|---|---|
| 6,739,311 B1 * | 5/2004 | Kingsley | 123/323 |
| 6,793,256 B2 * | 9/2004 | Carley et al. | 293/109 |
| 7,246,613 B1 * | 7/2007 | Mohar | 124/57 |
| 2005/0038592 A1 * | 2/2005 | de Sylva | 701/101 |

* cited by examiner

APPARATUS TO IMMOBILIZE AN INTERNAL COMBUSTION ENGINE MOTOR VEHICLE

CROSS REFERENCE TO RELATED APPLICATIONS

This patent application is a continuation patent application, pursuant to 35 U.S.C. sec. 120, of U.S. patent application Ser. No. 10/941,144 filed Sep. 14, 2004, now U.S. Pat. No. 7,451, 851, which claims benefit of U.S. provisional patent application 60/503,513, filed Sep. 15, 2003, entitled A Method and Apparatus to Immobilize an Internal Combustion Engine Motor Vehicle, all of which are incorporated by reference herein in their entirety.

FIELD

The invention relates generally to stopping a motor vehicle, and more particularly to choking off and stopping an internal combustion engine.

BACKGROUND

Law enforcement officials must routinely stop motor vehicles by a roadway. As part of a routine procedure and for safety precautions, the motor vehicle operator is often requested to turn off the motor vehicle engine. The law enforcement officer may make such a request for additional reasons including suspicion that the vehicle operator may flee. In some cases, the vehicle operator does flee.

Additionally, law enforcement officials are often called on to forcibly stop a fleeing vehicle. High speed pursuit by law enforcement frequently results in personal injury and property damage. Often, law enforcement officers will pursue motor vehicle suspects for a considerable amount of time while subjecting the suspects, officers and bystanders to potential risk of injury and property damage during high speed pursuits. It is of interest that occupants of a fleeing vehicle, which may include hostages, not be injured by immobilization of the vehicle.

Known vehicle immobilization systems exhibit shortcomings and dangers to those involved in a vehicle chase and to innocent bystanders. One known method is to force the fleeing vehicle to stop by driving the pursuing vehicle to the side or in front of the fleeing vehicle, or to push the fleeing vehicle from a back corner so that the fleeing driver looses control of the vehicle. Other known methods of stopping fleeing vehicles include tire spikes and eventual fuel depletion. Tire spikes may lead to additional property damage by an uncontrollable vehicle. Fuel depletion often requires a lengthy hot pursuit during which persons and property are subject to possible injury and damage. Another known technique includes engaging a metal structure on the fleeing vehicle and force stopping the fleeing vehicle, which presents a difficult maneuver given a moving and evasive vehicle. Further, road blocks are not easily deployed or positioned and a fleeing vehicle may simply reroute to an alternate path around a road block.

A need for detaining or immobilizing motor vehicles also applies to other settings including border settings, military settings and water settings with boating vehicles. A need exists for a transportable, rapidly deployed, vehicle immobilization device that does not encompass the shortcomings and dangers of the prior art.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods and the like may not be set forth in detail in order to avoid obscuring the invention.

A method and apparatus of choking off and stopping an internal combustion engine is described herein. It will be apparent that features of the discussion and claims may be utilized with a motor vehicles including, a car, a truck, a boat, military vehicles, as well as other motor vehicles. In an embodiment, the present invention may be used to detain a stationary vehicle so that the engine shuts down and cannot be restarted until the device is removed. In another embodiment, the present invention may be used to stop a fleeing vehicle. In an embodiment, the present invention may be employed by law enforcement and at geographical borders of countries, or vehicle inspection checkpoints.

Figure 1:
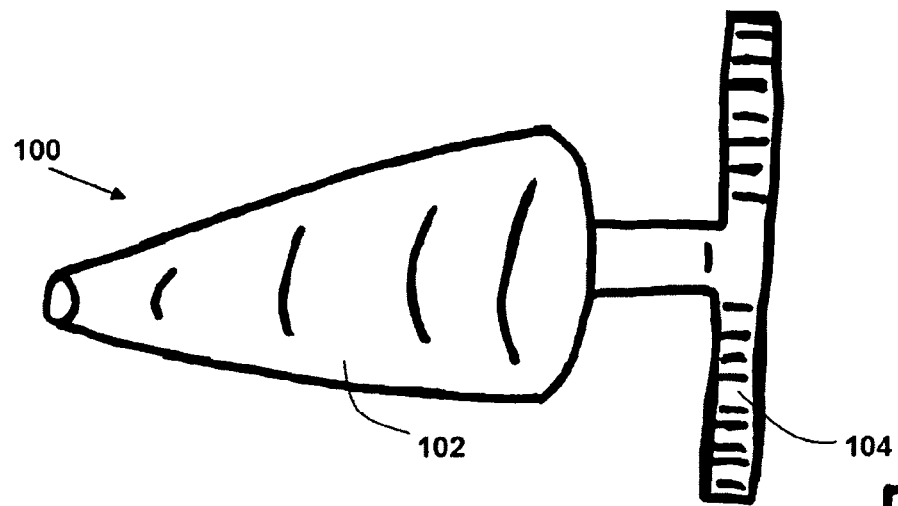
FIG. 1 is a side view of a conical plug having a handle, in an embodiment of the present invention.

Referring to the drawings wherein identical reference numerals denote the same elements throughout the various views, FIG. 1 illustrates stationary detainment device 100 in an embodiment of the present invention. Stationary detainment device 100 includes conical plug 102 having a handle 104. Conical plug 102 is shaped such that a first end is smaller in diameter than a second end, to fit with a variety of sizes or diameters of internal combustion engine exhaust pipes. As the plug enters an exhaust pipe, it reaches a position wherein it fits tight with and seals the exhaust pipe. Handle 104 is provided for a human hand to have a solid grasping place for facilitating insertion (and extraction) of the plug 102, and can be twisted to further obtain a tight fit within an exhaust pipe. Additionally, in an embodiment, plug 102 is comprised of a material (as discussed below) that expands upon heating, to further obtain a tight fit with the inside surface of an exhaust pipe. In an embodiment, plug 102 is formed of an adhesive material that adheres to a metal exhaust pipe.

The material selected for plug 102 is nonflammable when exposed to temperatures of hot exhaust fumes that are expelled from exhaust pipes. For better sealing results, plug 102 is comprised of a material that remains intact or does not substantially melt when being subjected to exhaust temperatures. It is to be appreciated that only a partial seal by plug 102 with an exhaust pipe can choke off and stop an internal combustion engine due to partial blockage. Therefore, while plug 102 might partially seal an exhaust pipe, the engine can in some cases nevertheless be stopped. Additionally, in an embodiment, plug 102 is comprised of a material that can be inserted into and exhaust pipe and pulled from or completely retracted from an exhaust pipe without leaving any remaining material in the exhaust pipe. Further, the plug 102 is to be of a material that is not easily blown or expelled from an exhaust pipe by exiting exhaust fumes.

Various materials can be used for plug 102. In an embodiment, the material is a sticky, tacky, gluey and metal adhesive substance. Alternatively, a sticky foam may be used. Further alternative materials that can be used for plug 102 include a caulk, putty, paste, plaster, bond, epoxy, adhesive, binder, sealant, glue, cement, gum, plaster, resin, motor, wax and tar.

In an embodiment, plug 102 is comprised of a metal adhesive. Metal adhesives include acrylic, polyurethane, PU, Polysufide, PSR, Anaerobic, Epoxy, EP, and cyanoacrylate. The bonding of an adhesive to an exhaust pipe is a result of mechanical, physical and chemical forces. One force, mechanical interlocking, is caused by mechanical anchoring of adhesive in the pores, holes, crevices and other irregularities of the exhaust pipe surface. Another force, electrostatic forces, is caused by differences in electronegatives of adhering materials, and other adhesion mechanisms dealing with intermolecular and chemical bonding forces that occur at interfaces. For example, when an organic polymer contacts metal, electrons are transferred from the metal into the polymer, creating an attracting electrical double layer. The electrostatic forces at the interface account for resistance to separation of the adhesive and the substrate.

An internal combustion engine may be stopped by sealing an exhaust pipe since the engine is choked off. In order for the engine to run, a fresh mixture of gasoline (fuel vapor) and air must be introduced into the combustion chamber. However, the fresh mixture cannot be injected or be effective unless the spent, burned-up fumes and exhaust is expelled. Further, back pressure in the engine prevents the engine from restarting.

It is to be appreciated that conical plug 102 having handle 104 provides an easily transportable and rapidly deployed device for emergency use. The conical plug 102 and handle 104 may further be carried by law enforcement officers on foot, attached to a person's belt.

Figure 2:
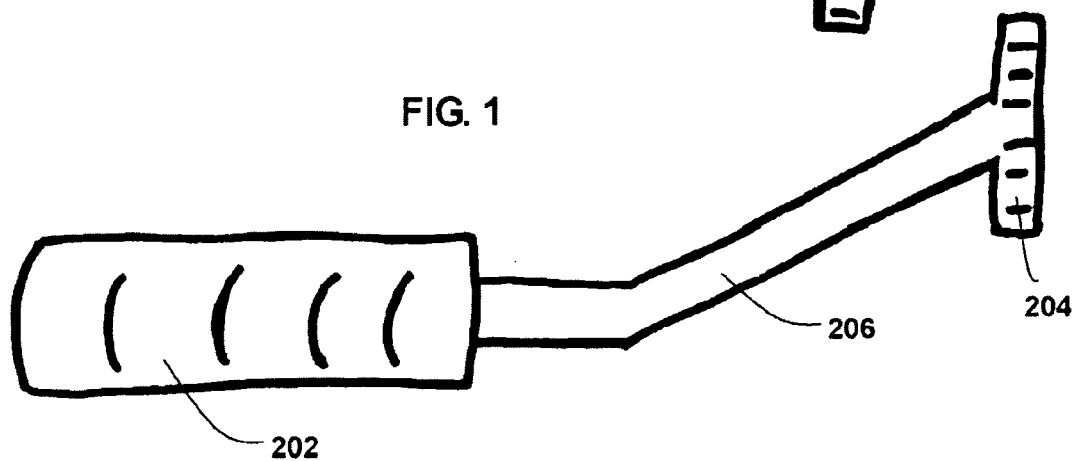
FIG. 2 is a side view of a rectangular plug having an extension and handle, in an embodiment of the present invention.

FIG. 2 is a side view of a rectangular plug 202 having an extension 206 and handle 204, in an embodiment of the present invention. Rectangular plug 202 is an alternative shape to conical plug 102. Extension 206 is provided for additional reach by a human to an exhaust pipe and can be used to seat plug 202 further into an exhaust pipe.

Figure 3:
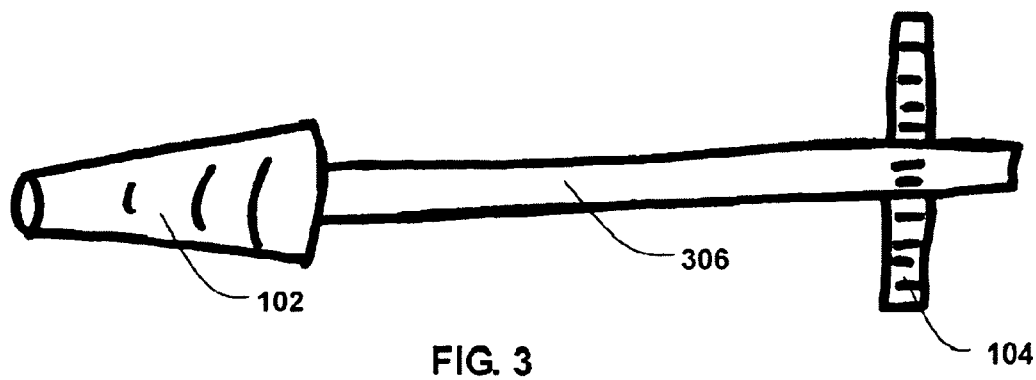
FIG. 3 is a side view of a conical plug having an extension and handle, in an embodiment of the present invention.

FIG. 3 shows is a side view of conical plug 102 having an extension 306 and handle 104 in a further embodiment of the present invention. Extension 306 can be sized as a desired length.

Figure 4:
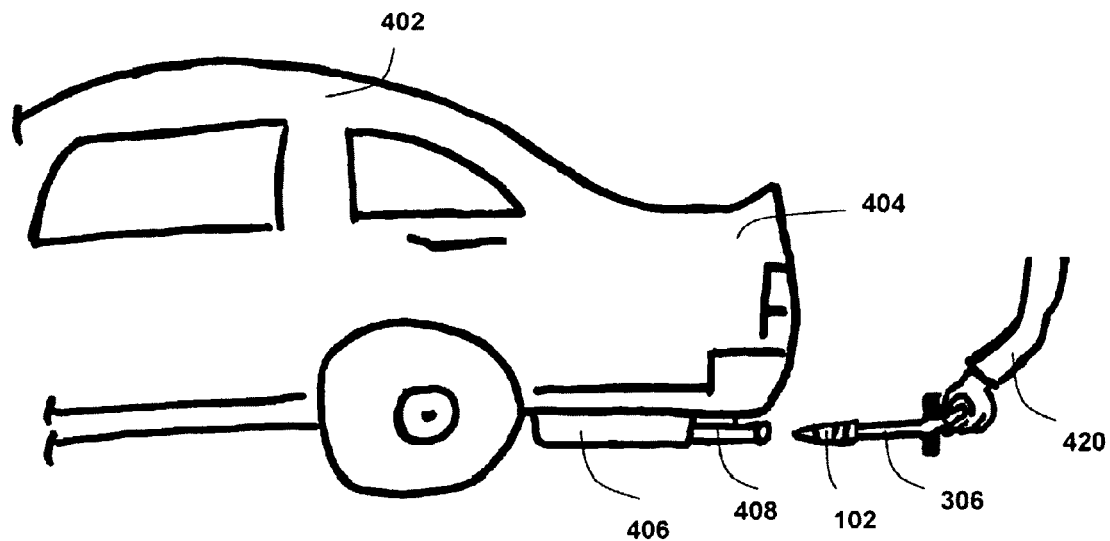
FIG. 4 is a side view illustration of insertion of a plug by a human into an exhaust pipe of a motor vehicle, in an embodiment of the present invention.

FIG. 4 is a side view illustration of insertion of plug 306 by a human 420 into an exhaust pipe 408 of a motor vehicle 402. This method may be utilized by a law enforcement officer to detain a stationary vehicle by stopping the internal combustion engine. As may be observed, extension 306 provides additional reach for insertion of plug 102 into exhaust pipe 408. Muffler 406 is shown connected to exhaust pipe 408, positioned at the back end 404 of detained vehicle 402.

Further, to the advantage of the law enforcement officer, the operator/driver of vehicle 402 would not have a clear view (or any view) of the actions by a law enforcement officer inserting plug 102 into exhaust pipe 408, and the engine may quit before the vehicle operator realizes what has occurred.

Figure 5:
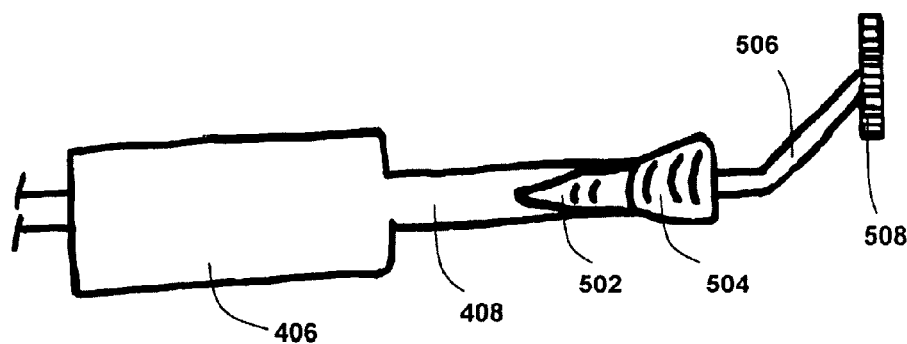
FIG. 5 is a side view illustration of a plug having been inserted into an exhaust pipe of a motor vehicle, in an embodiment of the present invention.

FIG. 5 shows a side view illustration of a plug having been inserted into an exhaust pipe of a motor vehicle. It is to be observed that plug 502 extends into exhaust pipe 408 and, in an embodiment, is compressed and also expands in any internal exhaust pipe surface irregularities forming a tight seal, while plug end 504 expands around an outer edge of exhaust pipe 408. Extension 506 and handle 508 provide additional reach to exhaust pipe 408, and a twisting/tightening means for a human. Plug 502 could be extracted from exhaust pipe 408 when desired by pulling on handle 508.

Figure 6:
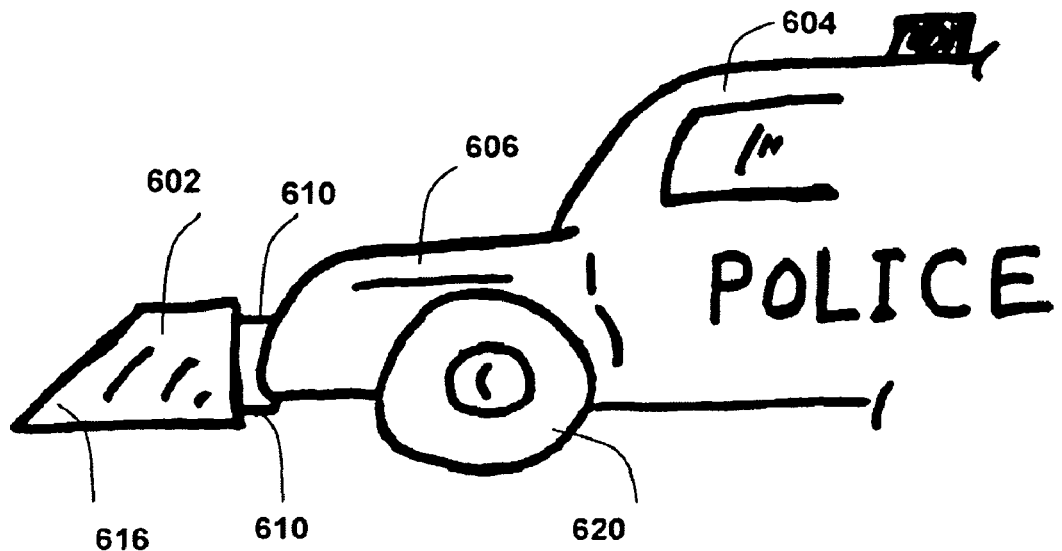
FIG. 6 is a side view illustration of a plug block mounted to the front end of a law enforcement vehicle, in an embodiment of the present invention.

FIG. 6 shows a side view illustration of a plug block 602 mounted to the front end 606 of a law enforcement vehicle 604, in an embodiment of the present invention. Attachment 610 provides an attachment means for attaching plug block 602 to front end 606. Plug block 602 is positioned clear and safely away from air intake/radiator or tires 620 of law enforcement vehicle 604. In an embodiment, plug block 602 is shaped having an angled and extended end 616 for directed impact and insertion into an exhaust pipe of a fleeing vehicle.

Figure 7:
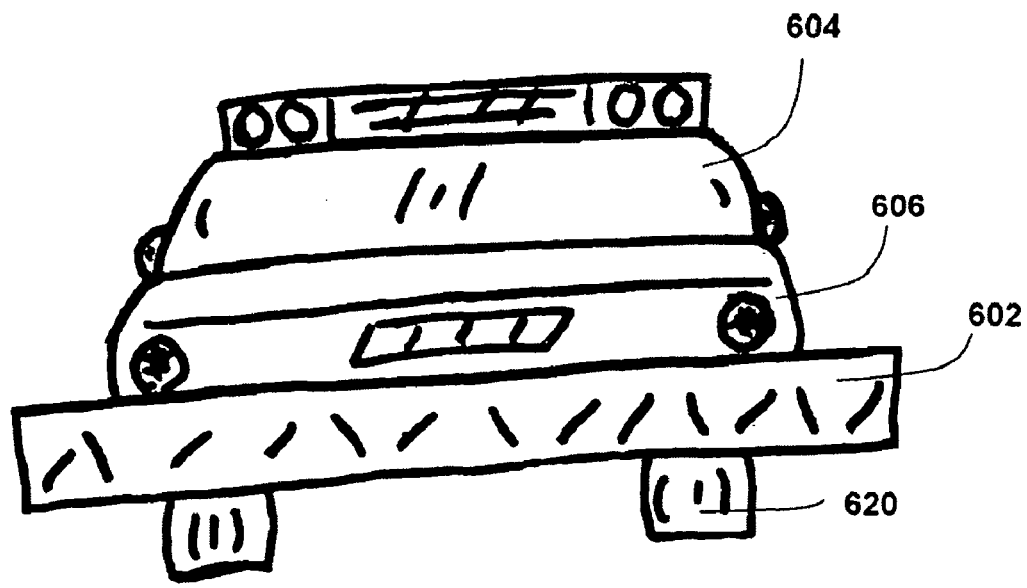
FIG. 7 is a front view illustration of a plug block mounted to the front end of a law enforcement vehicle, in an embodiment of the present invention.

FIG. 7 shows a front view illustration of plug block 602 mounted to the front end 606 of a law enforcement vehicle 604, in an embodiment of the present invention. It will be observed that, in an embodiment, plug block 602 extends across the entire width of law enforcement vehicle 604. The height and width of plug block 602 can be designed as desired, but should not obstruct the law enforcement vehicle 604 driver/operator view. It is to be appreciated that plug block 602 can take on other shapes, dimensions and position orientations other than that as shown in FIG. 7.

Figure 8:
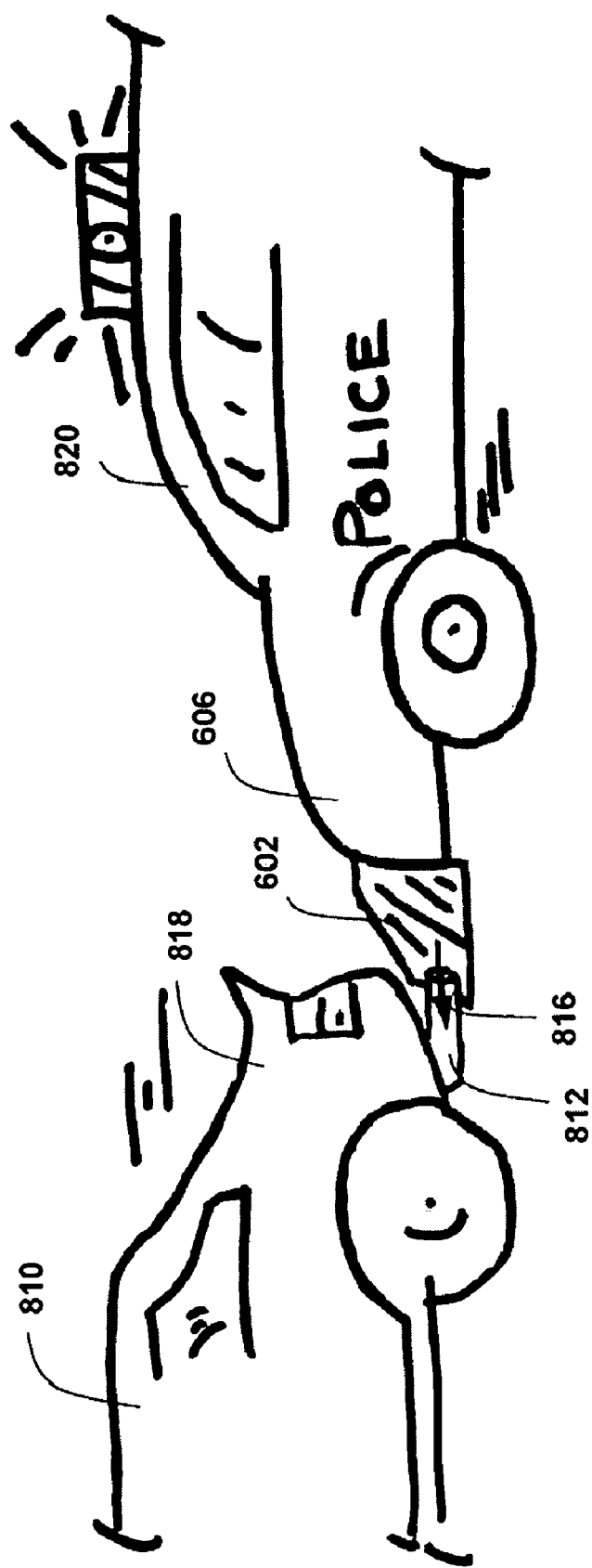
FIG. 8 is a side view illustration of a law enforcement vehicle having a plug block mounted to the front end forcing plug material into an exhaust pipe of a fleeing vehicle, in an embodiment of the present invention.

FIG. 8 shows a side view illustration of a law enforcement vehicle 820 having a plug block 602 mounted to the front end 606, forcing material 816 into an exhaust pipe 812 of a fleeing vehicle 810. The front end 606 of law enforcement vehicle 820 is driven into the back end 818 of the fleeing vehicle 810, wherein a portion of the plug block 602 is forced into exhaust pipe 812 of fleeing vehicle 810. In some cases, the back end 818 of fleeing vehicle 810 will be squared up with law enforcement vehicle 820, and in other cases the back end 818 of fleeing vehicle 810 will not be squared up with law enforcement vehicle 820. However, plug block 602 can in many cases nevertheless be forced into exhaust pipe 812. Once the plug block 602 is forced into exhaust pipe 812 of the fleeing vehicle 810, a portion of the plug block 602 can break off or separate from the portion attached to law enforcement vehicle 820. It is to be appreciated that the material utilized for plug block 602 can be similar or the same as that utilized for plug 102 (FIG. 1). However, the material utilized for plug block 602 (and inserted in an exhaust pipe) should readily break or separate from the portion attached to law enforcement vehicle 820. This way, it is unnecessary for law enforcement vehicle 820 to maintain contact or a close proximity to fleeing vehicle 810. Once some portion of plug block 602 is forced into and sufficiently seals exhaust pipe 812, the fleeing vehicle will either slow or stop, since the exhaust of the internal combustion engine will be obstructed. Loss of control of fleeing vehicle 810 is therefore avoided since forcing the vehicle into an out-of-control spin is avoided. Should the fleeing driver attempt to restart the vehicle, attempts would be futile in virtually all or all cases. A non-lethal method and device is therefore provided by the present invention to stop a fleeing vehicle and driver. Further, it is to be appreciated that plug block 602 provides an easily transportable and rapidly attachable and deployed device for emergency use.

Other features and advantages of this invention will be apparent to a person of skill in the art who studies this disclosure. For example, the plug 102 (FIG. 1) may be further employed in a situation wherein vehicle door and ignition keys are locked within a vehicle and it is desired that the vehicle be shut down. Thus, exemplary embodiments, modifications and variations may be made to the disclosed embodiments while remaining within the spirit and scope of the invention as defined by the appended claims.

What is claimed is:

1. An apparatus for obstructing exhaust being expelled, choking and stopping an internal combustion engine motor vehicle comprising a predetermined length of a material for attaching to a first vehicle and engaging an end of an exhaust pipe of a second vehicle, wherein at least a portion of the material is structured to readily separate from the first vehicle upon contact with the second vehicle, and remain in place as an obstruction to the exhaust pipe of the second vehicle while the second vehicle at least one of chokes and stops, wherein the engaging of the material is physically controlled by an occupant of the first vehicle by way of the first vehicle, and wherein the first vehicle forces against the second vehicle to engage the end of the exhaust pipe of the second vehicle with the material situated therebetween.

2. The apparatus as in claim 1, wherein the material extends along a front leading end of the first vehicle, wherein the material is at least one of adhesive to a metal exhaust pipe and expands upon being heated, and wherein the first vehicle is physically moving and the second vehicle is physically moving, or the first vehicle is physically moving and the second vehicle is stationary, or the first vehicle is stationary and the second vehicle is physically moving.

3. The apparatus as in claim 1, wherein the material is formed in the shape of a wedge, wherein a lower portion of the wedge extends further from the first vehicle as compared to an upper portion of the wedge.

4. The apparatus as in claim 1, wherein the material is comprised of at least one of a sticky material, tacky material, gluey material, and a foam.

5. The apparatus as in claim 1, wherein the material is comprised of at least one of a caulk, putty, paste, plaster, bonding substance, epoxy, adhesive, binder, sealant, glue, cement, gum, resin, wax and tar.

6. The apparatus as in claim 1, wherein the material is comprised of a metal adhesive including one of acrylic, polyurethane (PU), polysufide (PSR), anaerobic adhesive, epoxy (EP), and cyanoacrylate.

7. The apparatus as in claim 1, wherein the material is readily transportable by the first vehicle, and rapidly deployable and attachable to the first vehicle during a vehicle pursuit emergency.

8. An apparatus for obstructing exhaust being expelled, choking and stopping an internal combustion engine motor vehicle comprising a predetermined length of a material for attaching to a first vehicle and engaging an end of an exhaust pipe of a second vehicle while the material is attached to the first vehicle, wherein at least a portion of the material is structured to readily separate from the first vehicle upon contact with the second vehicle, and remain in place as an obstruction to the exhaust pipe of the second vehicle while the second vehicle at least one of chokes and stops, and wherein the first vehicle remains in physical contact with land that is situated below the first vehicle.

9. The apparatus as in claim 8, wherein the material extends along a front leading end of the first vehicle, wherein the material is at least one of adhesive to a metal exhaust pipe and expands upon being heated, and wherein the first vehicle is physically moving and the second vehicle is physically moving, or the first vehicle is physically moving and the second vehicle is stationary, or the first vehicle is stationary and the second vehicle is physically moving.

10. The apparatus as in claim 8, wherein the material is formed in the shape of a wedge, wherein a lower portion of the wedge extends further from the first vehicle as compared to an upper portion of the wedge.

11. The apparatus as in claim 8, wherein the material is comprised of at least one of a sticky material, tacky material, gluey material, and a foam.

12. The apparatus as in claim 8, wherein the material is comprised of at least one of a caulk, putty, paste, plaster, bonding substance, epoxy, adhesive, binder, sealant, glue, cement, gum, resin, wax and tar.

13. The apparatus as in claim 8, wherein the material is comprised of a metal adhesive including one of acrylic, polyurethane (PU), polysufide (PSR), anaerobic adhesive, epoxy (EP), and cyanoacrylate.

14. The apparatus as in claim 8, wherein the material is readily transportable by the first vehicle, and rapidly deployable and attachable to the first vehicle during a vehicle pursuit emergency.

\* \* \* \* \*